United States Patent [19]

Borovski

[11] Patent Number: 5,238,211
[45] Date of Patent: Aug. 24, 1993

[54] COLLAPSIBLE DRINK CONTAINER HOLDER FOR A VEHICLE

[76] Inventor: Abraham Borovski, 14/9 Aliat Hanoar, St. Jerusalem 97234, Israel

[21] Appl. No.: 820,085

[22] Filed: Jan. 13, 1992

[51] Int. Cl.⁵ .............................................. A47F 5/00
[52] U.S. Cl. .................................. 248/311.2; 248/293; 248/284
[58] Field of Search ................. 248/311.2, 309.1, 315, 248/283, 293; 211/85, 80, 81; 224/42.44; 220/737, 742

[56] References Cited

U.S. PATENT DOCUMENTS

| | | | |
|---|---|---|---|
| 2,649,270 | 8/1953 | Franks | 248/311.2 |
| 2,706,049 | 4/1955 | Andrews | 248/293 X |
| 2,754,078 | 7/1956 | Koger et al. | 248/311.2 |
| 3,233,858 | 2/1966 | Benjamin | 248/311.2 |
| 4,191,350 | 3/1980 | Ormond | 248/311.2 X |
| 4,749,112 | 6/1988 | Harper | 248/311.2 X |
| 4,828,211 | 5/1989 | McConnell et al. | 248/311.2 |
| 4,892,281 | 1/1990 | DiFilippo et al. | 248/311.2 |
| 4,928,865 | 5/1990 | Lorence et al. | 211/81 X |

*Primary Examiner*—Karen J. Chotkowski
*Attorney, Agent, or Firm*—Helfgott & Karas

[57] ABSTRACT

A collapsible holder for a drink container for a vehicle comprises a base for attaching to a supporting surface of the vehicle, and an annular support for supporting the drink container. The support is hingedly attached to the base so as to be rotatable into a substantially horizontal plane for supporting the drink container and to be rotatable into a plane substantially parallel to the supporting surface of the vehicle when not in use. The base has a pair of opposing side wall members projecting from a back portion, and a retaining portion for engaging a rear portion of the annular support after it has been rotated into a substantially horizontal plane and preventing further rotation thereof.

9 Claims, 3 Drawing Sheets

COLLAPSIBLE DRINK CONTAINER HOLDER FOR A VEHICLE

FIELD OF THE INVENTION

This invention relates to a drinks holder for mounting in a vehicle and for supporting therein a drink container.

BACKGROUND OF THE INVENTION

It is a well-known drawback of most motor vehicles, particularly family saloon cars, that there is no convenient place for supporting drinks so that a motorist or a passenger wishing to drink during a journey must himself hold the drink or, alternatively, make use of a bottle with a screw top which can be replaced and put aside when not in use. This, of course, is inconvenient so far as passengers are concerned and is positively dangerous as far as the motorist is concerned.

The above-mentioned drawback is overcome in more expensive saloon cars by the provision of a suitable drink container holder, which is typically provided as an integral feature of the car itself. To this extent, it cannot be removed and is normally fixed to the dashboard of the vehicle, from which it projects.

Such an arrangement is not particularly convenient for several reasons. First, its location is determined by the manufacturer of the motor vehicle and may not always be ideal from the user's point of view. Second, space is always at a premium inside a motor vehicle and, consequently, the fact that the drink container holder permanently projects from the dashboard makes it difficult for the motorist or a passenger to move across from one side of the vehicle to the other, which can be irritating. To overcome this problem, some expensive cars have a drink container holder built-in to the dashboard so that it may be retracted therefrom when required. However, this is a highly customized solution to the problem which is not capable of general application and further increases the cost of the device.

Possibly this accounts for the fact that, to date, drink container holders in family saloon cars tend to be provided only on the more luxurious, and therefore bigger, cars where rather more space is available. On the other hand, it may also account for the fact that even though such drink container holders have been proposed in the patent literature since the early part of the century, the market-place testifies that they have been far from successful, their market being limited, as explained, to relatively large, luxury cars. In short, in spite of the vast effort which apparently has been expended in trying to provide a universally acceptable drink container holder for a motor vehicle, an acceptable solution to the problem remains outstanding.

Many of the drink container holders which have been proposed are theoretically based on the gyroscopic principle in an attempt to ensure that the top surface of a drink remains level even during sudden spurts of acceleration or deceleration of the vehicle. Thus, gimbal-type bearings are provided for supporting two mutually orthogonal axes of rotation, whereby effective rotation of the car itself about a third axis induces gyroscopic precession which theoretically stabilizes the liquid level in the drink container holder.

Thus, for example, U.S. Pat. No. 4,819,843 (Nakayama) discloses such a drink container holder comprising three members: a mounting base having a mounting device for mounting within a vehicle, a holding framework for holding a cup, and an intermediate, pivotable framework interposed between the mounting base and the holding framework. The three members are pivotably connected to one another through pivotable shaft bearing portions. The mounting device comprises a substantially inverted U-shaped bracket and the mounting base has dependent bearing portions integrally suspended therefrom. A substantially U-shaped bail member is provided upon the holding framework, and the mounting base, holding framework and intermediate framework are mutually pivotable about two orthogonal axes, such that the three members effectively define gimbal rings for supporting the drink container.

It should further be noted that such a device, and many of similar ilk, are intended to overcome the inherent drawback of making a drink container holder integral with the dashboard of the motor vehicle. Thus, the device proposed by Nakayama is not permanently fixed to the interior of the motor vehicle but, rather, is adapted to be suspended to an edge portion of the vehicle's door. Furthermore, assuming that an average sized cup or drink container is to be supported by the drinks holder, then, even when not in use, the device would project some 10 cm from the mounting surface with the attendant drawbacks described above.

Additionally, it might be mentioned that whilst, in theory, the provision of gimbal rings is an attractive feature of the device proposed by Nakayama, in practice for such a device to be effective in maintaining the stability of the liquid level, the bearings would have to be of such quality that the resulting cost of the drink container holder would represent a not insignificant proportion of the total cost of the vehicle itself. If, on the other hand, such quality is sacrificed and the friction of the bearings is thus not minimal, the device would not achieve its objective.

In any case, there are many situations when liquid spillage is not a primary concern. For example, canned drinks having a key-ring type opening, provide only a small aperture from which drink may escape and thus do not present a very serious spillage problem. Even were the Nakayama or similar devices to be used for supporting canned drinks, no particular regard being had for possible spillage of its contents, such devices still suffer from the drawbacks described in detail above. Specifically, the Nakayama device must be mounted on the door frame itself and is not amenable to mounting on the dashboard. Its location within the vehicle is therefore not subject to the user's choice. Furthermore, the Nakayama device is expensive, requiring, in effect, three separate rings, only one of which actually secures the side wall of the drink container. Most important of all, the Nakayama device is not collapsible and therefore, whether or not it is actually being used, it always projects its full depth (at least 10 cm) from its supporting surface.

U.S. Pat. No. 2,926,879 (Dietrich) discloses a tumbler holder not specifically intended for motor vehicles, comprising a horizontally-disposed ring having diametrically opposed holes, a horizontally-disposed U-shaped yoke, also having diametrically opposed holes aligned with those of the ring, the yoke being outside of the ring, and a U-shaped springy wire whose ends engage corresponding holes in the ring and adjoining yoke. In such an arrangement, the horizontally-disposed U-shaped yoke is removably coupled to a wall mount and the horizontally-disposed ring is capable of rotation into a vertical plane, parallel to the U-shaped springy wire when the device is not in use. However, it is clear that such a device is not intended for use in a vehicle on account of the fact that no provision is made for limiting the rotation of the horizontally-disposed ring, so that a tumbler supported therein would suffer from virtually undamped movement commensurate with every lurch of the vehicle. Even were such a device to be used for supporting canned drinks, such that the attendant risk of spillage is small, such unrestricted movement is, of course, highly undesirable.

SUMMARY OF THE INVENTION

It is an object of the invention to provide a collapsible drink container holder for a vehicle, in which the drawbacks associated with hitherto-proposed devices are significantly reduced or eliminated.

According to the invention, there is provided a collapsible drink container holder for a vehicle, said drink holder comprising:

a base for attaching to a supporting surface of the vehicle, and an annular support hingedly attached to the base so as to be rotatable into the substantially horizontal plane for supporting therein a drink container and so as to be rotatable into a plane substantially parallel to said supporting surface of the vehicle when not in use;

said base including:

a pair of opposing side wall members projecting from a back portion, and a retaining means for retaining a rear portion of the annular support when it is rotated into said substantially horizontal plane thereby preventing further rotation thereof.

Preferably, the whole device is formed from three separate plastics moldings, the base being glued to the dashboard at a position selected by the user. The resulting device is light and inexpensive and, when not in use, projects no more than 3.5 cm from the surface of the dashboard.

The support ring is maintained in a horizontal plane by means of a retaining means which, most simply, is in the form of a stop plate provided on the base, a lower surface of which contacts an upper surface of the annular support when the annular support is rotated into a horizontal plane, thereby preventing further rotation thereof.

Preferably, the U-shaped bracket is made of resilient material and has an internal width at opposite ends thereof slightly less than an outer surface of the side wall members of the base to which the annular support is pivoted. On collapsing the drink holder, the annular support is rotated upwards and the U-shaped bracket downwards, so as to cause the opposite ends of the U-shaped bracket to splay apart and grip the outer surface of the side wall members. By this means, the drink container holder remains collapsed regardless of any sudden movement of the motor vehicle.

BRIEF DESCRIPTION OF THE DRAWINGS

For a fuller understanding of the invention, a preferred embodiment will now be described, by way of non-limiting example only, with reference to the accompanying drawings, in which.

DETAILED DESCRIPTION OF A PREFERRED EMBODIMENT

Figure 1:
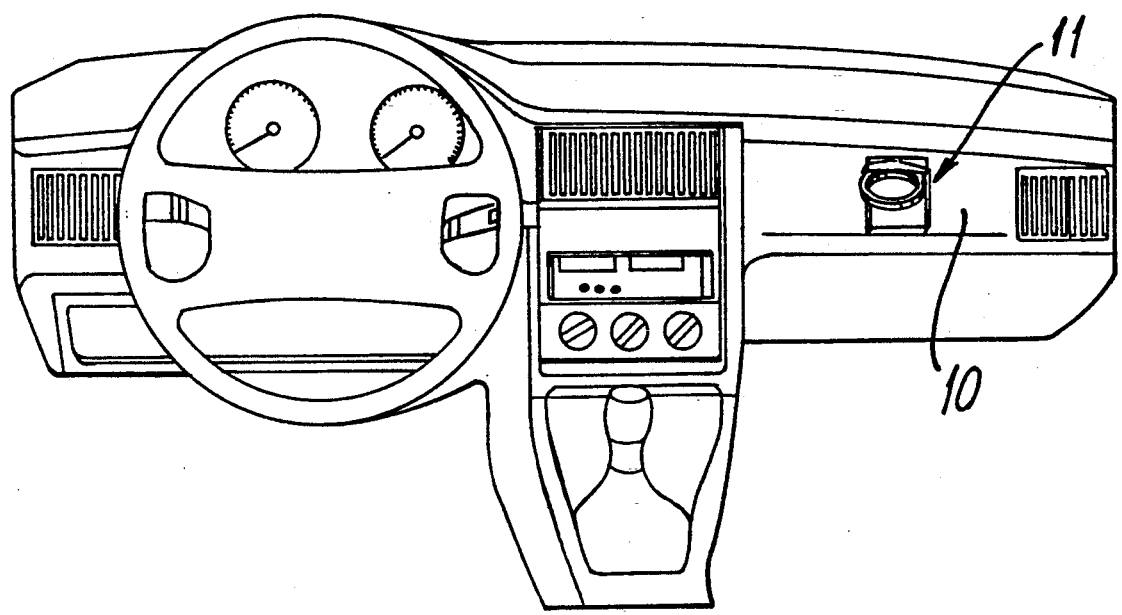
FIG. 1 is a pictorial representation of a motor car's interior showing a drink container holder according to the invention attached to its dashboard.

FIG. 1 shows the interior dashboard 10 of a motor vehicle having a drink container holder designated generally as 11 mounted on the passenger side thereof.

Figure 2:
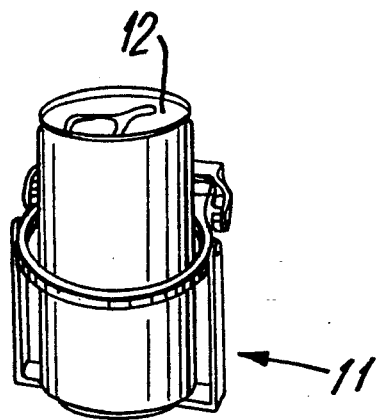
FIG. 2 is a pictorial representation of the drink holder shown in FIG. 1, supporting a canned drink therein.

In FIG. 2 there is shown a canned drink 12 supported within the drink holder 11 in a manner which will now be described in detail with reference to FIGS. 3 to 6 of the drawings.

Thus, there are shown in FIGS. 3 to 6 detailed perspective views of the drink holder 11 comprising a base 13 having pair of opposing side wall members 14 and 15 projecting from a back portion 16 and having a substantially planar cover plate 17, which functions partly as a strengthening rib and, more particularly, as a retaining means as will be described in greater detail below.

An annular support 18 is hingedly attached to the base 13 by means of pivots 19 and 20 (constituting a first pair of pivots) attached to the annular support 18 towards a rear portion 21 thereof, and which engage and are supported by corresponding collars 22 and 23 on an inside surface of the side wall members 14 and 15, respectively.

Projecting from each side of the rear portion 21 of the annular support 18 is a small bulbous protrusion 25 which engages a corresponding aperture 26 in the side wall of the base 13 when the annular support 18 is rotated into a substantially horizontal plane. The small bulbous protrusion 25, together with the corresponding aperture 26, constitutes a clasp for maintaining the annular support 18 in a horizontal plane, even in spite of sudden movement or the vehicle in which the drinks holder 11 is mounted.

In order that drink containers having substantially parallel side walls may also be supported by the drink holder 11, there is further provided a U-shaped bracket 30 which is swingably attached to the annular support 18 by means of pivots 31 and 32 (constituting a second pair of pivots) protruding outwardly from diametrically opposite sides of the annular support 18 through corresponding apertures at opposite ends 33 and 34 of the U-shaped bracket 30.

Figure 4:
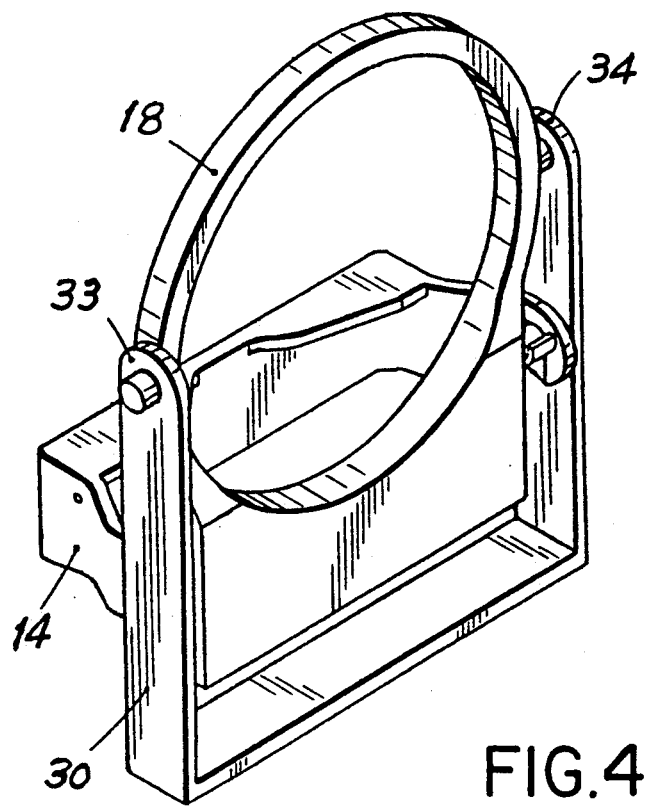
FIG. 4 is a perspective view of the drink holder in its collapsed position when viewed from the front.

The U-shaped bracket is made of plastics and its internal width at the opposite ends 33 and 34 is slightly less than the width of an outer surface of the side wall members 14 and 15, so that when the drink container holder 11 is collapsed as shown in FIG. 4, by rotating the annular support 18 upwardly about the pivots 19 and 20, the sides of the U-shaped bracket 30 may be splayed apart slightly, thereby gripping the side wall members 14 and 15 of the base 13 and preventing the annular support 18 from falling into its operational position consequent to sudden movements of the vehicle to which it is attached.

Figure 3:
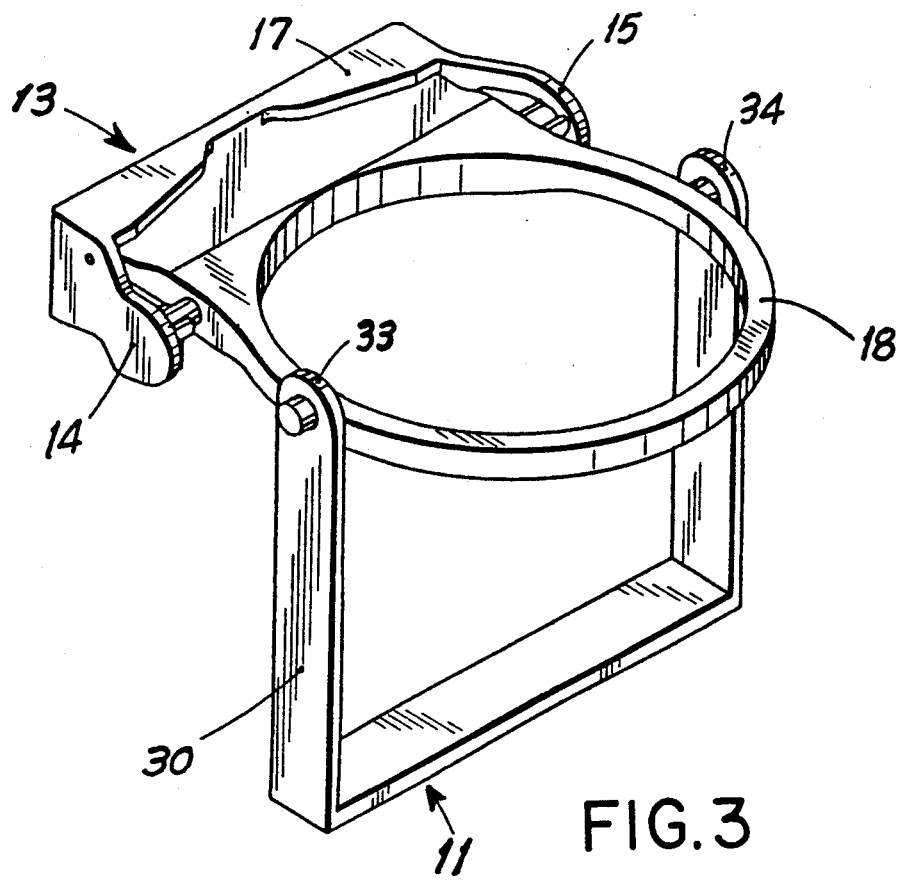
FIG. 3 is a perspective view of the drink holder in its operational position.

When it is required to use the drink holder 11, the annular support 18 together with the U-shaped bracket 30 is rotated from the collapsed state shown in FIG. 4 of the drawings to its operative state shown in FIG. 3. It will be seen from FIG. 3 that this causes the annular support 18 to rotate about its pivots 19 and 20 until its rear portion 21 abuts the lower surface of the cover plate 17. In this condition, the rear portion 21 of the annular support 18 is retained by the cover plate 17, which thus constitutes a retaining means, such that further rotation of the annular support 18 is prevented.

Figure 5:
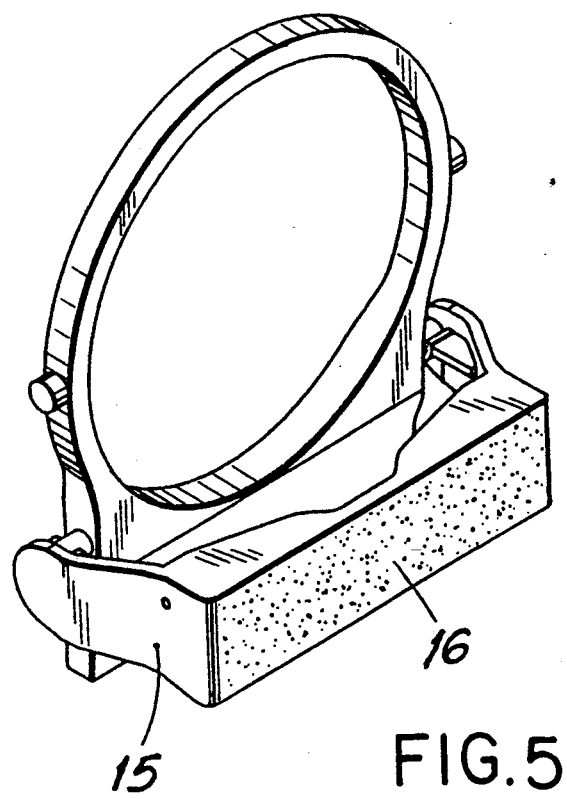
FIG. 5 is a partial perspective view of the drink container holder in its collapsed position when viewed from the rear.
Figure 6:
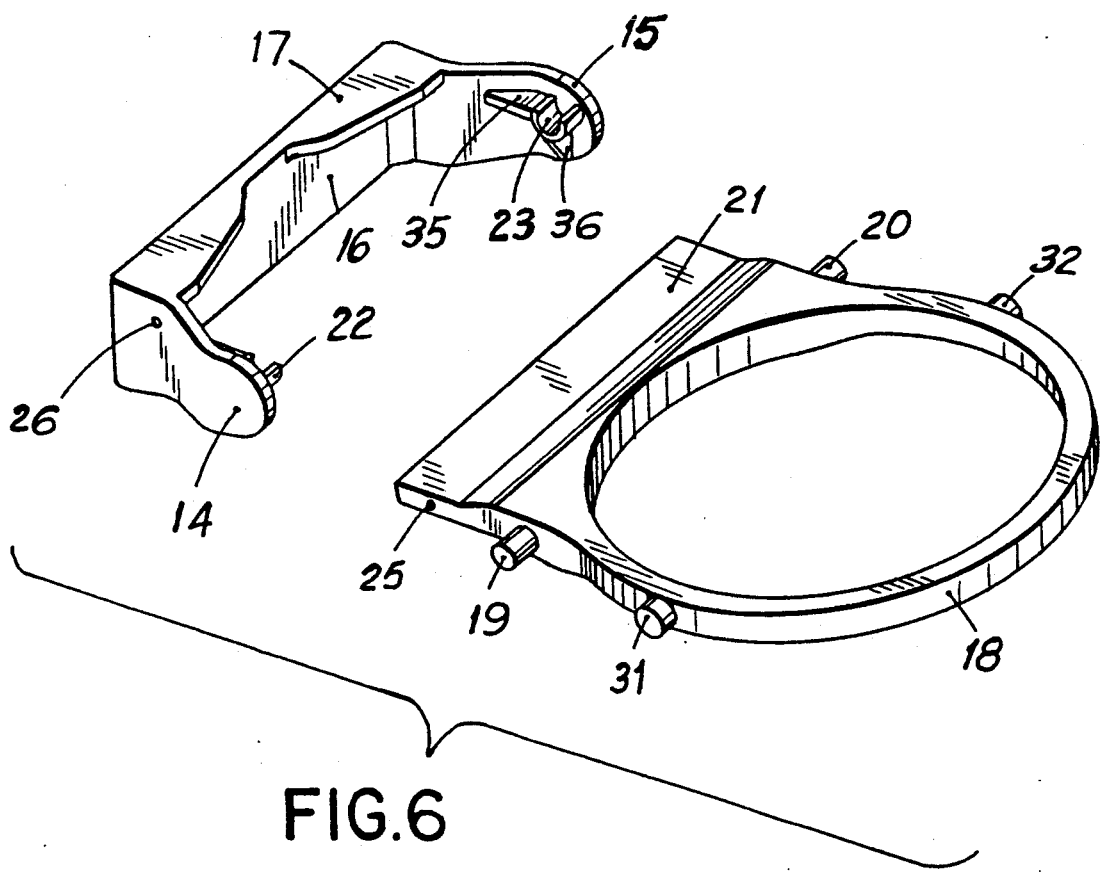
FIG. 6 is an exploded view showing a detail of the drink container holder.

As seen clearly in FIGS. 5 and 6 of the drawings, the cover plate 17 is perpendicular to the back portion 16 of the base 13, such that the annular support 18 lies in a horizontal plane when the back portion 16 is vertical. Such an arrangement is suitable for vehicles whose dashboards are vertical. However, the shape of the back portion 16 of the base 13 may easily be adapted to fit the contour of a dashboard which is not vertical, in order that, even when the drink container holder 11 is fitted to such dashboards, the annular support 18 will lie substantially horizontal when in use.

In the preferred embodiment, all the components of the drink holder 11 are formed of plastic moldings and the collars 22 and 23 are reinforced by means of integrally molded reinforcing ribs 35 and 36. Preferably, the depth of the base member 13 is no greater than 3.5 cm and, in its collapsed state as depicted in FIG. 4, the annular support 18 and the U-shaped bracket 30 lie flush with the front of the base 13, such that the complete drink container holder projects no more than 3.5 cm from the surface of the dashboard.

Preferably, the rear surface of portion 16 of the base 13 is fixed to the dashboard with adhesive, although self-tapping screws and other suitable means of attachment are equally suitable.

I claim:

1. A collapsible drink container holder for a vehicle, comprising:
    a base for attaching to a supporting surface of the vehicle;
    an annular support for receiving therein a drink container, said support being hingedly attached to the base so as to be rotatable into a substantially horizontal plane for supporting the drink container received therein and to be rotatable into a plane substantially parallel to said supporting surface of the vehicle when not in use, said annular support including a rear portion integral therewith;
    said base including:
        a back portion,
        a pair of opposing side wall members projecting from the back portion, and
        a retaining means for engaging the rear portion of the annular support after it has been rotated into said substantially horizontal plane and preventing further rotation thereof;
    a rigid U-shaped bracket swingably attached to the annular support so that in use it is suspended therefrom to support a base of the drink container and when not in use it may be rotated into the plane of the annular support; and
    at least one clasp for stabilizing the annular support in said horizontal plane, said at least one clasp comprising a protrusion projecting from a wall of the base for engaging a corresponding aperture in the annular support.

2. The drink container holder according to claim 1, wherein the retaining means comprises a substantially horizontal stop plate having a lower surface disposed above an upper surface of the rear portion of the annular support when the annular portion is in said substantially horizontal plane, whereby said upper surface of the rear portion of the annular support contacts the lower surface of the stop plate and is retained thereby.

3. The drink container holder according to claim 2, wherein said rear portion is substantially coplanar with the annular support and the lower surface of the stop plate is disposed above a hinge line about which the annular support is rotated relative to the base.

4. The drink container holder according to claim 1, wherein the annular support has opposite sides provided with a first pair of pivots for engaging corresponding collars formed on inside surfaces of said side wall members of the base.

5. The drink container holder according to claim 4, wherein the collars and the base are formed from an integral plastics molding.

6. The drink container holder according to claim 5, wherein the collars are strengthened by respective reinforcing ribs integrally molded therewith.

7. The drink container holder according to claim 4, wherein the U-shaped bracket is made of plastic material and has two opposite ends and an internal width between the opposite ends is slightly less than that defined between outer surfaces of said side wall members of the base, whereby the holder may be collapsed by rotating the annular support upwards and the U-shaped bracket downwards so as to cause said opposite ends of the U-shaped bracket to splay apart and grip the outer surfaces of the side wall members.

8. The drink container holder according to claim 7, wherein the annular support is provided on the opposite sides with a second pair of pivots for engaging corresponding apertures in the opposite ends of the U-shaped bracket.

9. The drink container holder according to claim 1, which is so dimensioned that when not in use the holder projects at most 3.5 cm from said supporting surface of the vehicle.

* * * * *